United States Patent Office 3,105,773
Patented Oct. 1, 1963

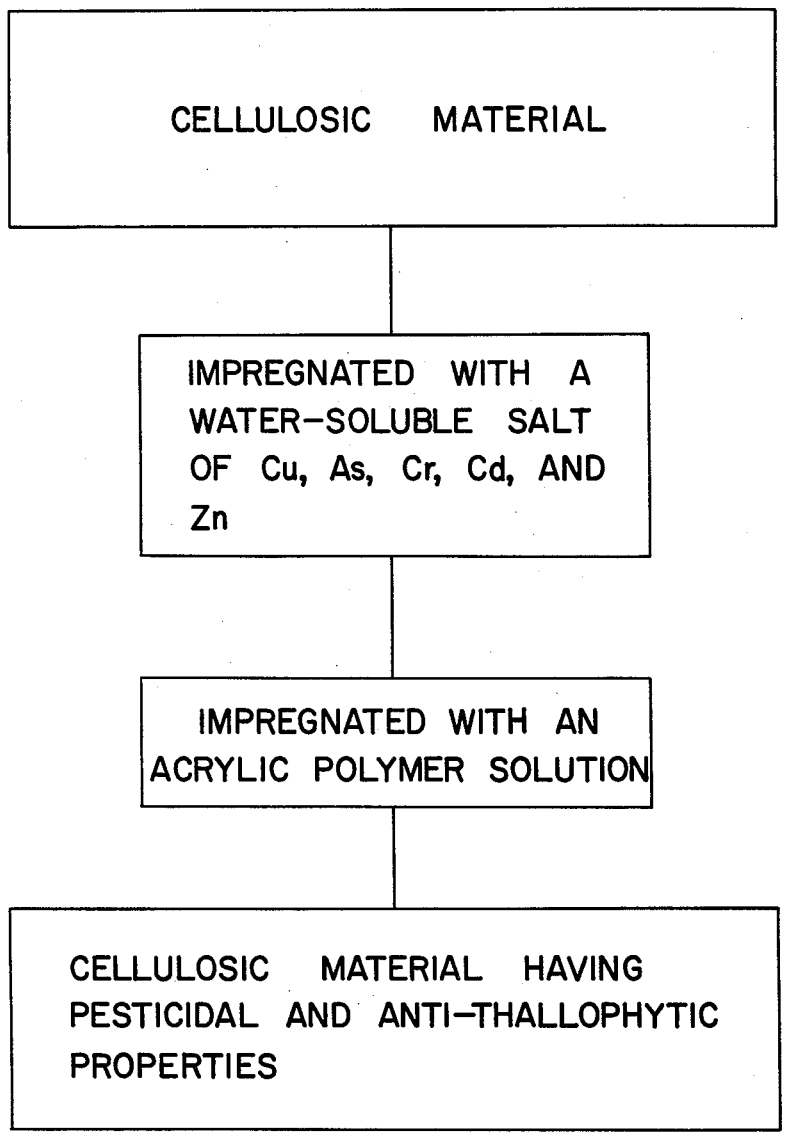

3,105,773
PRESERVATION OF CELLULOSIC MATERIALS
Simon Frank and Donald C. Wehner, Stamford, Conn.,
assignors to American Cyanamid Company, New York,
N.Y., a corporation of Maine
Filed Oct. 28, 1959, Ser. No. 849,168
10 Claims. (Cl. 117—72)

The present invention relates to the preservation of cellulosic materials by imparting pesticidal and anti-thallophytic properties thereto. The invention has as its more essential application the protective treatment against decay of cellulosic materials such as wood, textiles, paper and paperboard, rope, etc. and is especially useful in protecting such materials when they are subjected to decomposition promoting conditions of temperature, moisture and other pestiferous environments such as damp soil or pollution. As employed herein, pesticide connotes a substance toxically effective not only against insects, e.g., termites, but also against such destructive sources of decay which may be included within the term referred to as thallophytes and which includes plants or growths such as algae, bacteria, fungi, protozoans, lichens, marine organisms such as barnacles, other minute plant life, and the like. In addition, the process of the invention fortifies the cellulosic material against attack from weather.

Although various techniques for preventing decay of cellulosics are known and engender a formidable variety of organic and inorganic agents, each of the known prior techniques has definite limitations. The present invention provides a significant improvement in the efficiency and duration of treatment over those of prior procedures. In general, the deficiencies of the prior art methods are traceable to the impracticalness or inefficiencies of substances or techniques employed. For example, corrosiveness of the treating agent is a frequent problem; or the agent used is effective only against a narrow spectrum of attacking organism; or, as in the case of cresote, it is unsuitable for exposed or painted surfaces; or the short life of the pesticidal substance, e.g., the water-soluble salts, deteriorate or are soon leached out of the cellulosic base.

It is an object of the invention to provide a method for producing pesticidal properties in cellulosic material such as wood, textiles, rope and the like, which is inexpensive and imparts to the cellulosic base a substantially permanent effectiveness against attack from a broad spectrum of organisms as well as decomposition conditions. Further objects and advantages will become apparent as the description of the invention proceeds.

In general, the method of the present invention consists in first effecting substantially complete impregnation of the cellulosic with an agent which is effective as a pesticide as well as an anti-thallophytic agent and subsequently impregnating the cellulosic material containing this agent with a metal salt reactable aqueous solution of an acrylic polymer of the formula

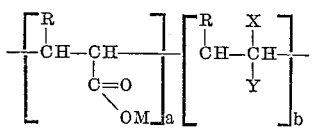

wherein R is a substituent selected from the group consisting of hydrogen and methyl radicals, X is a substituent selected from the group consisting of hydrogen and chlorine, M is a substituent selected from the group consisting of hydrogen and an alkali metal, and Y is a substituent selected from the group consisting of $CONH_2$, Cl, $C_6H_5$, H, $OCOCH_3$ and —CN, and the mole ratio of $a$ to $b$ at least 2.0:1. In essence, the polymeric material must comprise a major proportion of carboxylate units, "a" in the above formula, and must be water soluble.

An understanding of this invention will be facilitated by reference to the accompanying drawing, the single FIGURE of which is a flow sheet illustrating the present method.

We have discovered that by this two-step treatment the cellulosic material is thoroughly impregnated and given the property of lasting effectiveness against attack by thallophytes, marine organisms, and the like.

In selecting the pesticidal agent to be employed in the first step impregnation the known water-soluble agents for this purpose may be utilized. More specifically and preferably the water-soluble salts of metals such as copper, zinc, arsenic, cadmium and chromium are used. Various water-soluble salts of these metals are well known to those skilled in the art and many of the compounds contemplated are available commercially. Illustrative examples of suitable compounds of this type, for example, are cupric acetate, cupric chloride, copper salicylate, copper nitrate, copper formate, copper furoate, copper sulfate, copper chlorate, copper fluosilicate, cupric chloroacetate, zinc acetate, zinc chloride, zinc nitrate, zinc sulfate, zinc iodide, zinc formate, cadmium chloride, cadmium formate, cadmium sulfate, cadmium nitrate, chromic sulfate, chromic acetate, chromic nitrate, sodium arsenate and ammonium arsenate. The preferred salts are those of copper.

In the use of aqueous solutions of these agents, minor amounts of organic liquids, preferably water miscible organic compounds such as dioxane, ethyl alcohol, methyl alcohol and the like, in a manner well known to promote solution of polymers in water, may be added to facilitate solution. Additionally, small amounts of non-ionic wetting agents may be included to facilitate impregnation into the cellulosic substrate. Illustrative of the wetting agents which may be employed are the ethylene oxide condensation product of octyl phenol, available commercially under the trade name Triton X-100, and the ethylene oxide condensation product of nonyl phenol, available as Aerosol NI. Various other alkyl aryl polyether alcohol emulsifiers which may be employed in the practice of the present invention are available commercially. These are generally prepared by the condensation of ethylene oxide or other olefinic oxide and a suitable phenol.

The polymers used in the method of the invention are well known and may be prepared by conventional procedures or they may be obtained commercially. As shown by the general formula hereinabove, the polymeric material includes not only homopolymers of acrylic or methacrylic acid but also copolymers thereof containing minor amounts, i.e., less than about 40% by weight of a comonomer. In general, the mole ratio of acid monomer to different comonomer should be at least 2.0:1 and preferably at least 3.0:1. Suitable comonomers are those providing a water-soluble polymer when copolymerized with the acid monomer, e.g., acrylamide, methacrylamide, acrylonitrile, chloracrylonitrile, styrene, methylstyrene, vinyl chloride, vinylidene chloride, vinyl acetate, sodium, potassium, and lithium acrylates and methacrylates, and the like. When using copolymers it will be apparent that the polymer may be obtained by copolymerization or by converting some of the groups of a homopolymer as is known in the art. For example, a polymer may be prepared by copolymerizing acrylamide and acrylic acid, either with or without neutralization of the reaction product. In such a process two monomeric compounds are required. It is also known that similar polymeric compositions may be prepared by a controlled hydrolysis of polyacrylamide or polyacrylonitrile. It will be apparent also, as those skilled in the art will readily acknowledge, that in the case of comonomers of more limited water solubility, a lower ratio thereof may be necessary in order to produce complete water solubility of the copolymer.

In practicing the invention, it is necessary that the treatment of the cellulosic material be conducted in two steps, inasmuch as the simultaneous impregnation of the pesticide solution in admixture with the polymer is found not to impart the full advantages. The theory underlying the discovery of the present inventive concept is not precisely understood but it is believed that an interaction occurs between the pesticidal agent and polymer in situ, on the fibers of cellulose. The reaction, in effect, substantially insolubilizes and fixes the pesticide on the cellulose fibers making it an integral part of the fiber, thereby preventing the leaching out of the pesticide. The reaction between the metal inorganic salt and the carboxylate polymer imparts lasting permanence to the treatment.

The invention will be further disclosed by reference to the following examples, which it will be obvious serve only as illustration and are not, by the recited details, intended to serve as a limitation of the invention except as set forth in the claims. All parts are by weight unless specifically recited otherwise.

*Example 1*

One inch square wood blocks of southern pine, 3 batches with 6 blocks in each batch, were soaked in a bath of aqueous cupric acetate 2% solution at room temperature for 48 hours. After rinsing in fresh water, the blocks were then soaked for 72 hours in another bath containing aqueous polyacrylic acid prepared by diluting 100 parts of stock polymer solution containing 25% solids, average molecular weight 230,000, to 1000 parts. After another rinse, the blocks were allowed to dry at room temperature for three weeks and then tested against *Lenzites trabae*, *Lintinus lepideus* and *Poria monticola*, using the standard ASTM test, ASTM D1413–56T for wood preservatives by soil block cultures. At 3 and 7 months after placing blocks in test the treated blocks showed 70–90% less visible growth of all three test organisms than did the control blocks.

*Example 2*

Cotton duck was soaked in a 2% solution of aqueous copper sulfate until the cloth was thoroughly wet and then passed through rollers to remove excess solution. The damp fabric was then soaked in a bath containing polyacrylic acid prepared as, and of the same concentration, as Example 1, squeezed dry of most of the polymer bath solution by again passing through rollers and then air dried at room temperature. The dried cotton duck is then cut into 2" x 6" strips and placed on sterile mineral salts agar in petri dishes, inoculated with a spore suspension from *Chaetomium globosum*, and incubated at 30° C. for 2 weeks. At the end of the incubation period the untreated control pieces showed heavy mould growth while there was no visible growth on the material treated with the copper sulfate and polyacrylic acid solutions as described above.

*Example 3*

Four pieces of cork sheeting (6" square) are treated in a manner similar to that used in Example 2 except that a 3% solution of copper formate is employed in place of the copper sulfate solution of Example 2. The treated pieces as well as the control were inoculated with *Aspergillus niger* and *Tricoderma viride*. The pieces processed with copper formate and polyacrylic acid showed no visible attack. Distinct mould growth appeared on the control piece.

*Example 4*

Heavy wet strength paper (kraft bag type) is wet rolled and squeezed with a 2% aqueous solution of copper acetate and then with a 4% aqueous solution of acrylic acid-acrylamide copolymer (75:25 weight ratio) and subjected to burial in fertile garden loam for 2 weeks in a test patterned after the ASTM soil burial test. The treated paper together with the control was incubated at 30° C. for 3 weeks in soil containing 20 to 30% $H_2O$. The control is almost completely deteriorated by the end of the test period, whereas the paper treated with copper salt and copolymer shows no visible attack.

Two paper bags were formed from triple layers of the treated kraft paper. The bags are filled with sand, inoculated with *Chaetomium globosum* and *Myrothecium verrucaria* and immersed ½ in water. After 2 weeks, there was no visible deterioration of the paper sacks. A control sack of untreated kraft paper under the same conditions is significantly attacked, as evidenced by perforations and substantial leakage of sand.

*Example 5*

Sisal twine is treated with the copper phenolate and polyacrylic acid in the manner and concentrations used in Example 1 using *Aspergillus niger* and *Chaetomium globusum* as test organisms. Two four-foot sections of the twine together with control pieces of equal length are immersed in soil maintained with a moisture of at least 15% for 2 months. The copper salt-polymer treated sections have a tensile strength of at least 100% over the controls.

*Example 6*

Six-inch squares of jute burlap, 3 batches with 6 blocks in each batch, were soaked in a bath of aqueous ammonium arsenate, 2% solution, at room temperature for 8 hours. After rinsing in fresh water, the burlap was soaked for 4 hours in another bath comprising an aqueous solution of methacrylic acid-α-chloroacrylonitrile copolymer containing 3% dissolved polymeric solids, average molecular weight 180,000. After another rinse, the pieces were dried at room temperature and then tested using the soil burial test, in which the soil was maintained with a moisture content of 25%. A four-month burial period of treated and untreated control pieces shows substantially less visible growth on the arsenate-polymer treated pieces than on the control. The tensile strength of the control is less than 25% of the treated pieces.

*Example 7*

Cotton duck was soaked in a 5% solution of aqueous zinc sulfate until the cloth was thoroughly wet and then passed through rollers to remove excess solution. The damp fabric was then soaked in a bath comprising an 8% aqueous solution of methacrylic acid-ethyl acrylate-acrylonitrile terpolymer (70:25:5 mole ratio), squeezed dry of most of the bath solution by again passing through rollers and then air dried at room temperature. Small pieces of the dried fabric and control were then subjected to a rot resistance test by placing on a suitable agar medium maintained at 35° C. for 3 weeks with *Chaetomium globosum* culture. The untreated control was significantly attacked and decomposed, whereas the polymer treated piece was not visibly affected.

*Example 8*

Four pieces, 8-inches square, of quarter-inch plywood are immersed for two hours at 30° C. in a 2% aqueous solution of copper nitrate, rinsed and then immersed in a 4% aqueous solution of acrylic acid-acrylamide-vinyl acetate (70:20:10 weight ratio) for 1 hour, dried and subjected to immersion in the ocean for 3 months at a place known to contain many barnacles and Lemnoria. At the end of the test period the control pieces were coated with barnacles and showed damage from the Lemnoria borers while the treated boards were substantially free of barnacles and from attack by the latter.

Example 9

Cotton poplin is treated with the chromic sulfate and the terpolymer of Example 7 in the manner and concentrations used in Example 1 using *Aspergillus niger* and *Chaetomium globosum* as test organisms. Two four-foot sections of the square pieces of the fabric together with control pieces of equal size are immersed in soil maintained with a moisture of at least 35% for 2 months. The chromic salt-polymer treated sections are substantially intact. The controls were decayed considerably and had a tensile strength of about ⅕ that of the treated pieces.

Example 10

The procedure of Example 7 on cotton poplin is repeated with the exception that cadmium nitrate is used as the agent and a copolymer of methacrylic acid and acrylamide in a weight ratio of 60:40, respectively, is used. Essentially, the same results as in Example 7 were obtained, i.e., the treated pieces were not significantly attacked, whereas the control units were noticeably decayed.

It is apparent to those skilled in the art that additional modifications may be made in the foregoing details without departing from the inventive concept and the invention is not to be limited except as set forth in the claims hereinbelow.

1. A method for preserving cellulosic materials which consists essentially of impregnating the cellulosic material first with an aqueous solution of a metal salt selected from the group consisting of water-soluble pesticidal salts of copper, arsenic, chromium, cadmium and zinc, said salt being employed in pesticidally effective amounts and subsequently with an aqueous solution of a preformed acrylic polymer of the formula

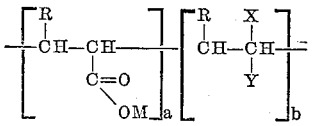

wherein R is a substituent selected from the group consisting of hydrogen and methyl radicals, X is a substituent selected from the group consisting of hydrogen and chlorine, M is a substituent selected from the group consisting of hydrogen and an alkali metal, and Y is a substituent selected from the group consisting of $CONH_2$, Cl, $C_6H_5$, H, $OCOCH_3$ and —CN, and the mole ratio of $a$ to $b$ is at least 2.0:1.

2. A method for preserving cellulosic materials which consists essentially of impregnating the cellulosic material first with an aqueous solution of a water-soluble pesticidal copper salt, said salt being employed in pesticidally effective amounts and subsequently with an aqueous solution of a preformed acrylic polymer of the formula

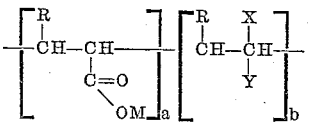

wherein R is a substituent selected from the group consisting of hydrogen and methyl radicals, X is a substituent selected from the group consisting of hydrogen and chlorine, M is a substituent selected from the group consisting of hydrogen and an alkali metal, and Y is a substituent selected from the group consisting of $CONH_2$, Cl, $C_6H_5$, H, $OCOCH_3$ and —CN, and the mole ratio of $a$ to $b$ is at least 2.0:1.

3. A method for preserving cellulosic materials which consists essentially of impregnating the cellulosic material first with an aqueous solution of a pesticidal metal salt selected from the group consisting of water-soluble salts of copper, arsenic, chromium, cadmium and zinc, said salt being employed in pesticidally effective amounts and subsequently with an aqueous solution of a preformed acrylic polymer comprising a major proportion of carboxylate units.

4. A method for preserving wood which consists essentially of impregnating the wood first with an aqueous solution of a pesticidal metal salt selected from the group consisting of water-soluble salts of copper, arsenic, chromium, cadmium and zinc, said salt being employed in pesticidally effective amounts and subsequently with an aqueous solution of a preformed acrylic polymer of the formula

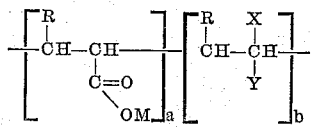

wherein R is a substituent selected from the group consisting of hydrogen and methyl radicals, X is a substituent selected from the group consisting of hydrogen and chlorine, M is a substituent selected from the group consisting of hydrogen and an alkali metal, and Y is a substituent selected from the group consisting of $CONH_2$, Cl, $C_6H_5$, H, $OCOCH_3$ and —CN, and the mole ratio of $a$ to $b$ is at least 3.0:1.

5. A method for imparting pesticidal properties to cotton fabric which consists essentially of impregnating the fabric first with an aqueous solution of a pesticidal metal salt selected from the group consisting of water-soluble salts of copper, arsenic, chromium, cadmium and zinc, said salt being employed in pesticidally effective amounts and subsequently with an aqueous solution of a preformed acrylic polymer of the formula

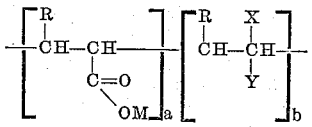

wherein R is a substituent selected from the group consisting of hydrogen and methyl radicals, X is a substituent selected from the group consisting of hydrogen and chlorine, M is a substituent selected from the group consisting of hydrogen and an alkali metal, and Y is a substituent selected from the group consisting of $CONH_2$, Cl, $C_6H_5$, H, $OCOCH_3$ and —CN, and the mole ratio of $a$ to $b$ is at least 3.0:1.

6. A method for preserving wood which consists essentially of impregnating the wood first with an aqueous solution of a water-soluble pesticidal copper salt, said salt being employed in pesticidally effective amounts and subsequently with an aqueous solution of a preformed acrylic polymer of the formula

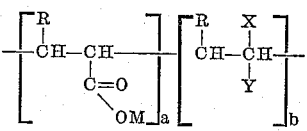

wherein R is a substituent selected from the group consisting of hydrogen and methyl radicals, X is a substituent selected from the group consisting of hydrogen and chlorine, M is a substituent selected from the group consisting of hydrogen and an alkali metal, and Y is a substituent selected from the group consisting of $CONH_2$, Cl, $C_6H_5$, H, $OCOCH_3$ and —CN, and the mole ratio of $a$ to $b$ is at least 3.0:1.

7. A method for preserving cotton fabric which consists essentially of impregnating the fabric first with an aqueous solution of a water-soluble pesticidal copper salt, said salt being employed in pesticidally effective amounts and subsequently with an aqueous solution of a preformed acrylic polymer of the formula

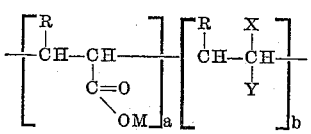

wherein R is a substituent selected from the group consisting of hydrogen and methyl radicals, X is a substituent selected from the group consisting of hydrogen and chlorine, M is a substituent selected from the group consisting of hydrogen and an alkali metal, and Y is a substituent selected from the group consisting of $CONH_2$, Cl, $C_6H_5$, H, $OCOCH_3$ and —CN, and the mole ratio of $a$ to $b$ is at least 3.0:1.

8. A method for preserving cellulosic materials which consists essentially of impregnating the cellulosic material first with an aqueous solution of a pesticidal metal salt selected from the group consisting of water-soluble pesticidal salts of copper, said salts being employed in pesticidally effective amounts and subsequently with an aqueous solution of a preformed polyacrylic acid.

9. A method for preserving cellulosic materials which consists essentially of impregnating the cellulosic material first with an aqueous solution of a pesticidal metal salt selected from the group consisting of water-soluble pesticidal salts of copper, said salts being employed in pesticidally effective amounts and subsequently with a preformed acrylic acid-acrylamide copolymer in a monomer mole ratio of at least 2.0:1.

10. Cellulosic material impregnated with an insoluble interaction product of a pesticidal metal salt selected from the group consisting of water-soluble salts of copper, arsenic, chromium, cadmium and zinc, said salt being employed in pesticidally effective amounts and a preformed acrylic polymer of the formula

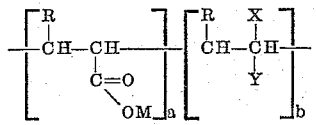

wherein R is a substituent selected from the group consisting of hydrogen and methyl radicals, X is a substituent selected from the group consisting of hydrogen and chlorine, M is a substituent selected from the group consisting of hydrogen and an alkali metal, and Y is a substituent selected from the group consisting of $CONH_2$, Cl, $C_6H_5$, H, $OCOCH_3$ and —CN, and the mole ratio of $a$ to $b$ is at least 2.0:1.

References Cited in the file of this patent

UNITED STATES PATENTS

| | | |
|---|---|---|
| 2,098,942 | Brubaker | Nov. 16, 1937 |
| 2,381,863 | Benignus | Aug. 14, 1945 |
| 2,754,280 | Brown et al. | July 10, 1956 |
| 2,763,579 | Schulenburg | Sept. 18, 1956 |
| 2,850,405 | Bottoms | Sept. 2, 1958 |
| 2,955,958 | Brown | Oct. 11, 1960 |

FOREIGN PATENTS

| | | |
|---|---|---|
| 818,412 | Great Britain | Aug. 19, 1959 |